(12) United States Patent
Park et al.

(10) Patent No.: US 7,209,463 B2
(45) Date of Patent: Apr. 24, 2007

(54) TRANSMISSION TIME ADJUSTING APPARATUS AND METHOD BETWEEN RNC AND UE IN A CDMA COMMUNICATION SYSTEM

(75) Inventors: Joon-Goo Park, Seoul (KR); Sung-Ho Choi, Songnam-shi (KR); Hyeon-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 1026 days.

(21) Appl. No.: 10/183,937

(22) Filed: Jun. 26, 2002

(65) Prior Publication Data
US 2003/0002470 A1   Jan. 2, 2003

(30) Foreign Application Priority Data
Jun. 30, 2001   (KR) .......................... 2001-0039177
Jul. 4, 2001   (KR) .......................... 2001-0041407

(51) Int. Cl.
*H04B 7/216* (2006.01)
(52) U.S. Cl. ...................... 370/335; 370/342
(58) Field of Classification Search ................ 370/342, 370/335, 320, 441, 331, 349, 322, 318, 326, 370/498; 455/522, 442; 375/356, 357
See application file for complete search history.

(56) References Cited

U.S. PATENT DOCUMENTS 6,907,248 B2 *   6/2005   Lee et al. .................... 455/450
6,961,398 B2 *   11/2005   Dick et al. .................. 375/356

\* cited by examiner

*Primary Examiner*—Chi Pham
*Assistant Examiner*—Alexander O. Boakye
(74) *Attorney, Agent, or Firm*—The Farrell Law Firm (57) ABSTRACT

A method of adjusting the transmission time of data in a CDMA communication system. A UE (User Equipment) measures the time difference between the received time of a downlink DPCH (Dedicated Physical Channel) and the transmitted time of an uplink DPCH and reports it to an RNC (Radio Network Controller). The RNC transmits transmission time adjustment information to a node B and the UE if the time difference is out of a predetermined range. The node B then adjusts the transmission time of the downlink DPCH according to the transmission time adjustment information and transmits the downlink DPCH at the adjusted time. The UE receives the downlink DPCH by adjusting a search time for the downlink DPCH according to the transmission time adjustment information.

17 Claims, 11 Drawing Sheets

TRANSMISSION TIME ADJUSTING APPARATUS AND METHOD BETWEEN RNC AND UE IN A CDMA COMMUNICATION SYSTEM

PRIORITY

This application claims priority to an application entitled "Transmission Time Adjusting Apparatus and Method between RNC and UE in a CDMA Communication System" filed in the Korean Industrial Property Office on Jun. 30, 2001 and assigned Serial No. 2001-39177 and to an application entitled "Transmission Time Adjusting Apparatus and Method between RNC and UE in a CDMA Communication System" filed in the Korean Industrial Property Office on Jul. 4, 2001 and assigned Serial No. 2001-41407, the contents of both of which are hereby incorporated by reference.

BACKGROUND OF THE INVENTION

1. Field of the Invention

The present invention relates generally to a method of transmitting DPCH (Dedicated Physical Channel) frames between an RNC (Radio Network Controller) and a UE (User Equipment) in a CDMA (Code Division Multiple Access) communication system, and in particular, to an ATTA (Adaptive Transmission Time Adjustment) method for adaptively adjusting transmission time between an RNC and a UE.

2. Description of the Related Art

In general, an RNC adjusts transmission time for data communication with a UE via a node B in a CDMA communication system. For the transmission time adjustment, the UE transmits an uplink DPCH frame $T_0$ chips (1024 chips) after receiving a downlink DPCCH (Dedicated Physical Control Channel)/DPDCH (Dedicated Physical Data Channel). The DPCCH and the DPDCH are collectively called the DPCH. In real implementation, however, a propagation time delay is involved according to the distance between the node B and the UE. In this case, a serving RNC (SRNC) requests the UE to report the time difference between the received time of the downlink DPCH (DL DPCH) frame and the transmitted time of the uplink DPCH (UL DPCH) frame (hereinafter, referred to as UE Rx–Tx time difference). The SRNC adjusts a DPCH frame offset IE (Information Element) in an RRC (Radio Resource Control) Reconfiguration message based on the UE Rx–Tx time difference in order to inform the UE about the transmission time adjustment. The SRNC only transmits the transmission time adjustment information to the UE but cannot adjust the transmission time of the UE.

Specifically, an RNSAP (Radio Network Subsystem Application Part)/NBAP (Node B Application Part) message has no IE related with downlink transmission time adjustment and thus does not support the downlink DPCH transmission time adjustment of the SRNC.

The UE usually transmits an uplink DPCH frame To chips after receiving a downlink DPCH frame. Here, an initial adjustment error must be limited within ±1.5 chips. The UE then adjusts its transmission time within a ¼ chip duration every time period of 200 ms from the downlink DPCH frame.

When the UE enters a handover region, it receives downlink DPCH data from a plurality of cells. Since each DPCH data has a different propagation delay, the UE cannot adjust its uplink DPCH transmission time. The UE performs a tracking process while implementing a handover from a source node B to a target node B. Also in the case, the UE receives signals with different propagation delays from the source node B and the target node B and thus cannot adjust its transmission time.

When the UE moves out of the handover region, the variance a of the time difference between the received time of the downlink DPCH frame and the transmitted time of the uplink DPCH frame may exceed an allowable value of 128 chips. Therefore the UE cannot adjust its transmission time.

Figure 1:
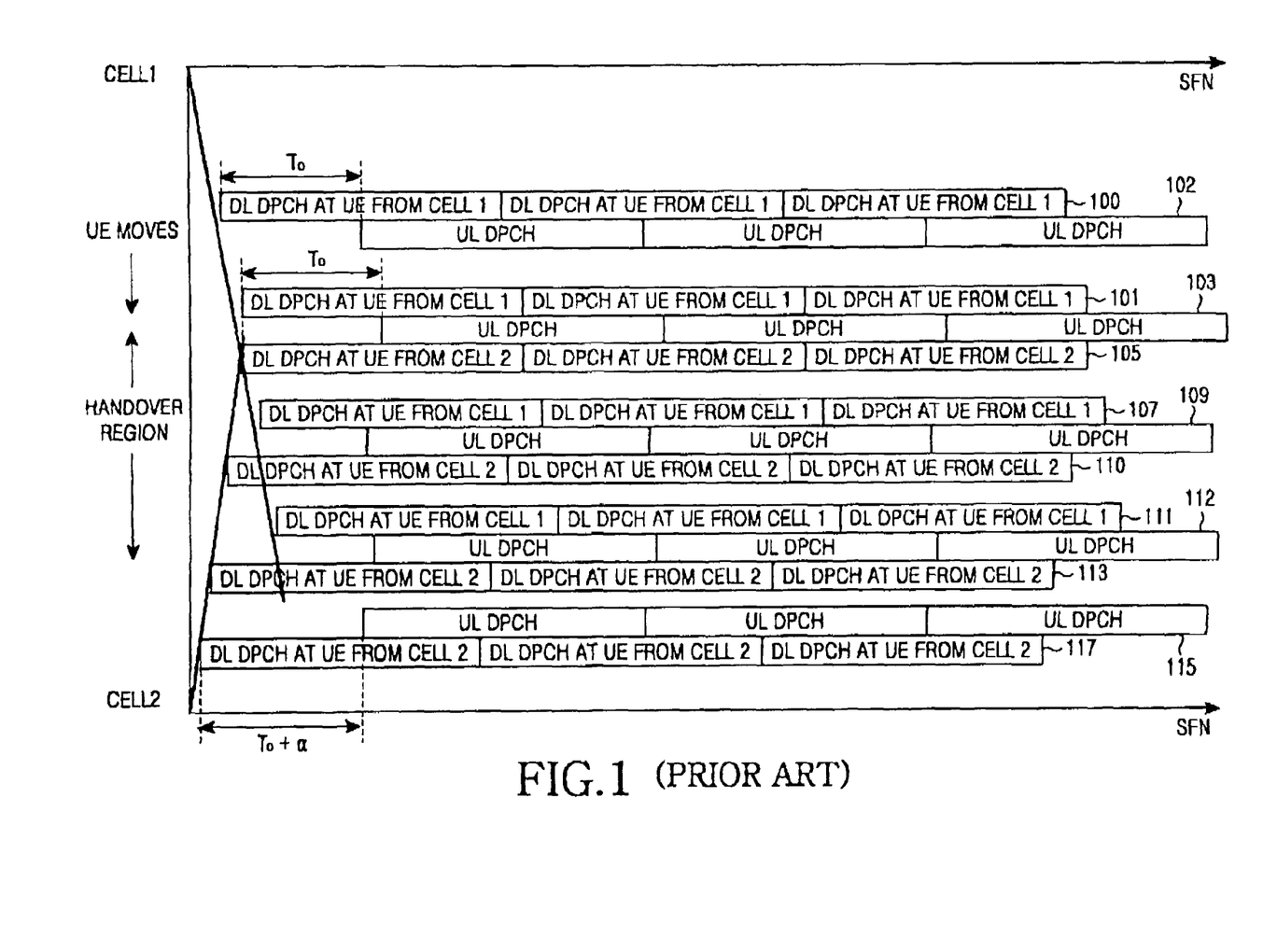
FIG. 1 illustrates a time relationship between a downlink DPCH and an uplink DPCH in a handover region in a typical CDMA communication system.

FIG. 1 illustrates a time relationship between downlink DPCH data and uplink DPCH data in a handover region on the assumption that the UE moves from cell 1 to cell 2. The UE adjusts its transmission time according to the transmission time of cell 1, at every predetermined time during handover, and then according to the transmission time of cell 2, after the handover is complete.

According to the first method, the UE transmits an uplink DPCH 103 time $T_0$ after receiving a downlink DPCH 101 from cell 1. In the second method, that is, when the UE enters the handover region, it receives downlink DPCHs 101, 105, 107, 110, 111 and 113 with different propagation delays from cell 1 and cell 2. Thus, the UE transmits uplink DPCHs 103, 109 and 112 in every predetermined time period without adjusting its transmission time. Then, when the UE moves out of the handover region and enters the coverage area of cell 2, the time difference of the received time of a downlink DPCH 115 and the transmitted time of an uplink DPCH 117 becomes $T_0+\alpha$. The UE performs a tracking process within a ¼ chip duration in the unit of 200 ms and thus the UE cannot adjust the transmission time of the uplink DPCH.

As described above, the conventional CDMA communication system has no path in which a control signal for robust transmission time adjustment between a downlink DPCH and an uplink DPCH is transmitted. Therefore, when the UE enters a handover region, it cannot adjust the transmission time of the uplink DPCH. Moreover, the tracking on the basis of the ¼ chip duration is insufficient to ensure the DPCH transmission time adjustment.

SUMMARY OF THE INVENTION

It is, therefore, an object of the present invention to provide a method of transmitting a control signal for adaptive transmission time adjustment of downlink and uplink DPCHs between an RNC and a UE.

It is another object of the present invention to provide a method of adjusting the transmission time of downlink and uplink DPCHs using control signals for adaptive transmission time adjustment between an RNC and a UE.

It is a further object of the present invention to provide a method of maintaining the time difference between the transmitted time of a downlink DPDCH from a node B and the transmitted time of an uplink DPDCH from a UE to be a predetermined value by changing the transmission time of the downlink or uplink DPDCH.

It is still another object of the present invention to provide an ATTA method between a plurality of nodes B and a UE in a handover region.

To achieve the above and other objects, there is provided a method of adjusting the transmission time of data in a CDMA communication system. A UE measures the time difference between the received time of a downlink DPCH and the transmitted time of an uplink DPCH and reports it to an RNC. The RNC transmits transmission time adjustment information to a node B and the UE if the time difference is out of a predetermined range. The node B then adjusts the transmission time of the downlink DPCH according to the transmission time adjustment information and transmits the downlink DPCH at the adjusted time. The UE receives the downlink DPCH by adjusting a search time for the downlink DPCH according to the transmission time adjustment information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides control signals for downlink DPCH-uplink DPCH transmission time adjustment between a UTRAN (UMTS Terrestrial Radio Access Network) and a UE. Especially, the present invention enables transmission time adjustment in such a non-time adjustment situation as a handover region illustrated in FIG. 1.

In accordance with the present invention, an RNC in the UTRAN requests the UE to measure the UE Rx–Tx time difference and report it. Based on the UE Rx–Tx time difference, the RNC decides whether to transmit the downlink DPCH or the uplink DPCH later than the previous time.

Figure 2:
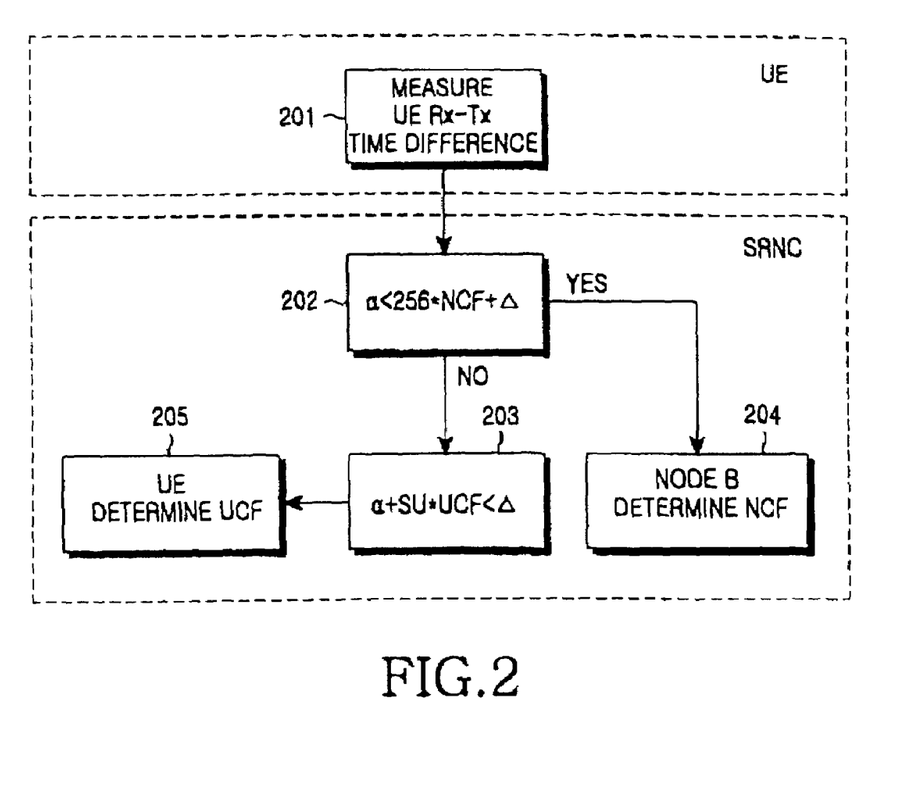
FIG. 2 illustrates a method of determining control factors by an RNC in a CDMA communication system according to the present invention.

Referring to FIG. 2, upon request from the RNC, the UE measures the UE Rx–Tx time difference ($\alpha$), which is defined as the time difference between the received time of the downlink DPCH and the transmitted time of the uplink DPCH, and reports it to the RNC in step 201. In step 202, the RNC compares the UE Rx–Tx time difference $\alpha$ with an allowed time difference $T_0+\Delta$. If Rx–Tx time difference($\alpha$) is equal to or greater than $T_0+\Delta$, the RNC determines whether $\alpha+SU \times UCF$ is less than another allowed time difference $\Delta$ in step 203. If the condition of step 202 is satisfied, the RNC determines to delay the downlink DPCH frame, and if the condition of step 203 is satisfied, the RNC determines to delay the uplink DPCH frame. In the former case, the RNC sets an NCF (Node B Control Factor) that makes $\alpha$ equal to or less than $\Delta$ after time alignment in step 204. In the latter case, the RNC sets a UCF (UE Control Factor) that makes $\alpha$ equal to or less than $\Delta$ after time alignment in step 205.

How the NCF and the UCF are determined will be described in more detail. Upon receipt of the UE Rx–Tx time difference from the UE, the RNC determines how long the downlink DPCH or uplink DPCH is to be delayed. That is, the RNC compares $T_0+\alpha$ with $T_0+\Delta$. Here, $\Delta$ is a threshold by which it is determines whether the node B and the UE is to adjust their transmission time. While $\Delta$ is variable, it is usually 128 chips, or 147 chips with an empirical stabilizing value added.

If $T_0+\alpha$ is greater than $T_0+\Delta$, the RNC decides to change the transmission time of the downlink DPCH from the node B. Then, in order to reset $T_0+\alpha$ to be $T_0$, the RNC delays the transmission time of the node B by a multiple of 256 chips. This time delay value is the NCF. On the other hand, if $T_0+\alpha$ is less than $T_0+\Delta$, the RNC decides to delay the transmission time of the UE. The time delay may be set on a chip basis or on the basis of a multiple of 256chips. This decision is implementation-dependent. The uplink time delay value is the UCF. Finally, if $T_0+\alpha$ is equal to $T_0+\Delta$, the RNC maintains the transmission time of the downlink and uplink DPCHs.

With regard to determination of delayed transmission of the downlink DPCH, the RNC determines whether the UE Rx–Tx time difference satisfies the condition expressed as $$\alpha < 256 \times NCF + \Delta \tag{1}$$

If Eq. (1) is satisfied, the RNC sets the NCF and transmits it to the node B by a Radio Link Reconfiguration Prepare message and to the UE by a Physical Channel Reconfiguration message. The NCF may be set to 1, 2 or 3 and as stated before, $\Delta$ is 128 chips, or 147 chips with an empirical stabilizing value added. The RNC sets a two-bit NCF to an appropriate value indicating the multiple of 256 chips in a reserved area, or additionally uses one bit to indicate the UCF or NCF in the Radio Link Reconfiguration Prepare message. The Physical Channel Reconfiguration message can be constructed in the same manner as the Radio Link Reconfiguration Prepare message. However, if the UCF is set on a chip basis, the number of chips to be shifted must be indicated in the messages.

Figure 3:
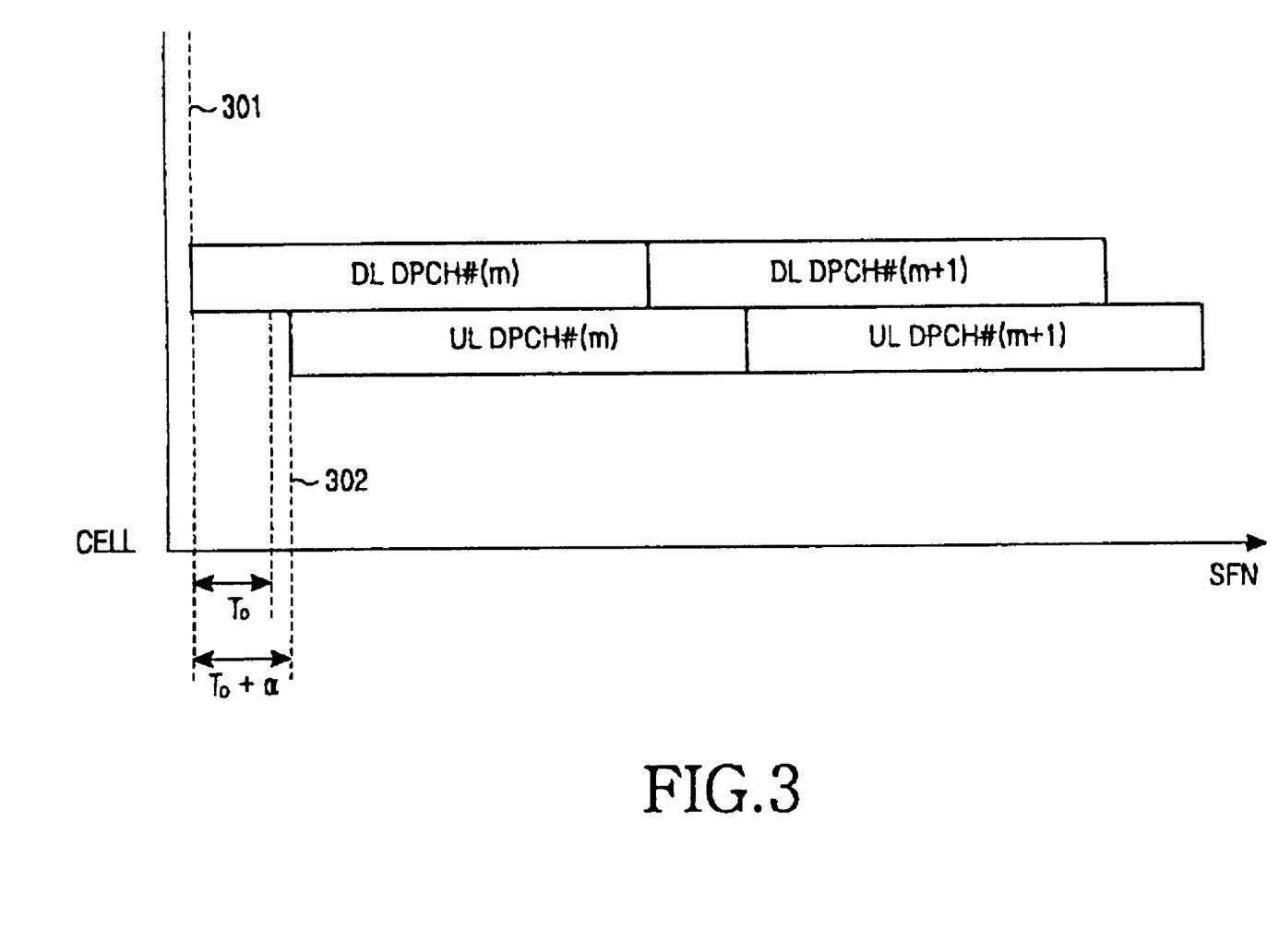
FIG. 3 illustrates the time difference between the received time of a downlink DPCH and the transmitted time of an uplink DPCH at a UE in the CDMA communication system according to an embodiment of the present invention.

FIG. 3 illustrates a time relationship between the downlink and uplink DPCHs on a CFN/SFN axis in the UE. Referring to FIG. 3, the time difference between the starting received time 301 of the downlink DPCH and the starting transmitted time 302 of the uplink DPCH is $T_0+\alpha$. $T_0$ is statically determined, 1024 chips and $\alpha$ is an accumulation of propagation delay for a predetermined time due to the movement of the UE.

Figure 4:
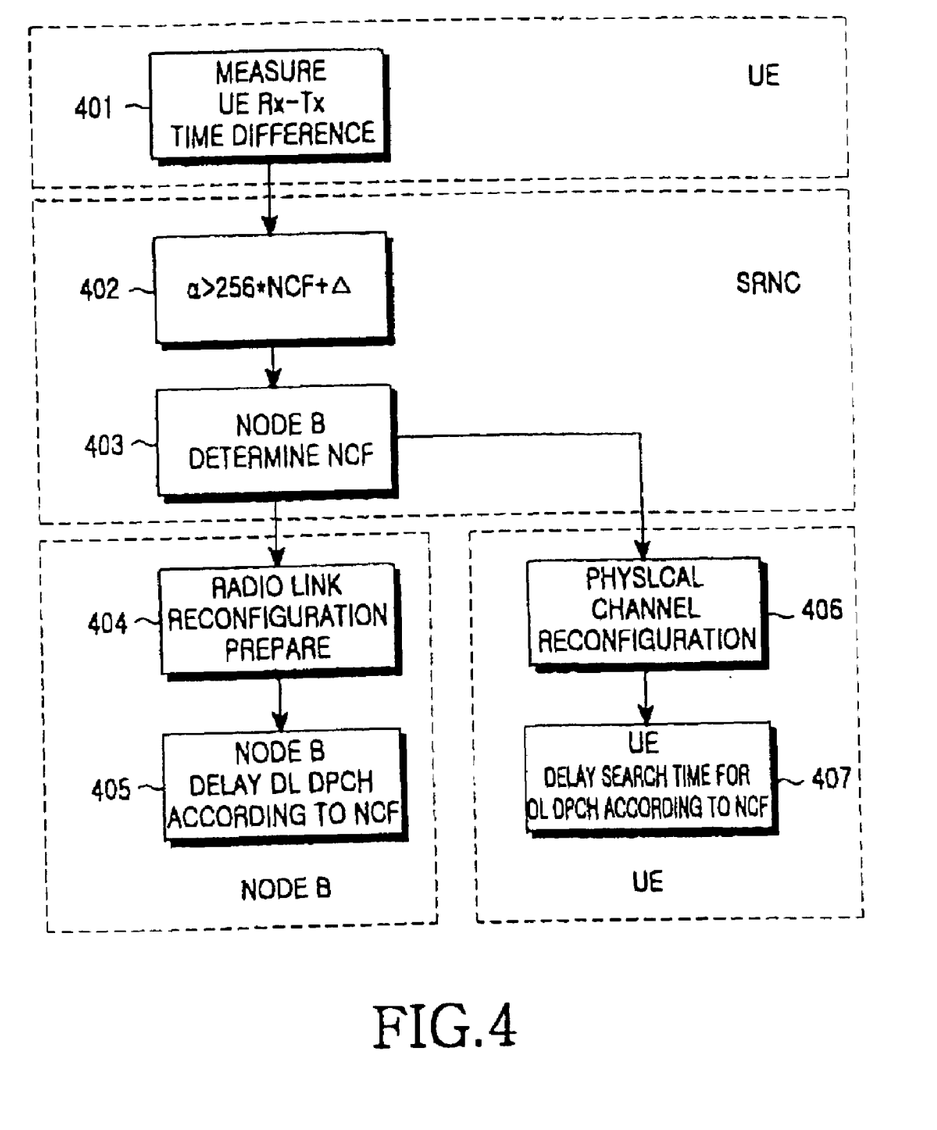
FIG. 4 is a flowchart illustrating an ATTA method in the CDMA communication system according to the embodiment of the present invention.

FIG. 4 is a flowchart illustrating a robust transmission time adjustment method in the CDMA communication system according to an embodiment of the present invention. Generation and transmission of the NCF will be described below with reference to FIG. 4.

Referring to FIG. 4, upon request from the RNC, the UE measures the UE Rx–Tx time difference using the received time of the downlink DPCH and the transmitted time of the uplink DPCH and reports it to the RNC via the node B in step 401. The RNC determines whether the UE Rx–Tx time difference satisfies Eq. (1) in step 402 and sets the NCF that makes $\alpha$ equal to or less than a threshold $\Delta$ if Eq. (1) is satisfied in step 403. The RNC transmits the NCF to the node B by the Radio Link Reconfiguration Prepare message in step 404 and to the UE by the Physical Channel Reconfiguration message in step 406. Upon receipt of the Radio Link Reconfiguration Prepare message, the node B detects the NCF from the message and delays the transmission time of the downlink DPCH frame according to the NCF in step 405. For example, if the NCF is 1, 2 or 3, the node B delays the downlink DPCH frame by 256 chips for NCF=1, by 256×2 chips for NCF=2, or by 256×3 chips for NCF=3. Upon receipt of the Physical Channel Reconfiguration message, the UE detects the NCF from the message and delays a searching time for the downlink DPCH frame according to the NCF in step 407.

Figure 5:
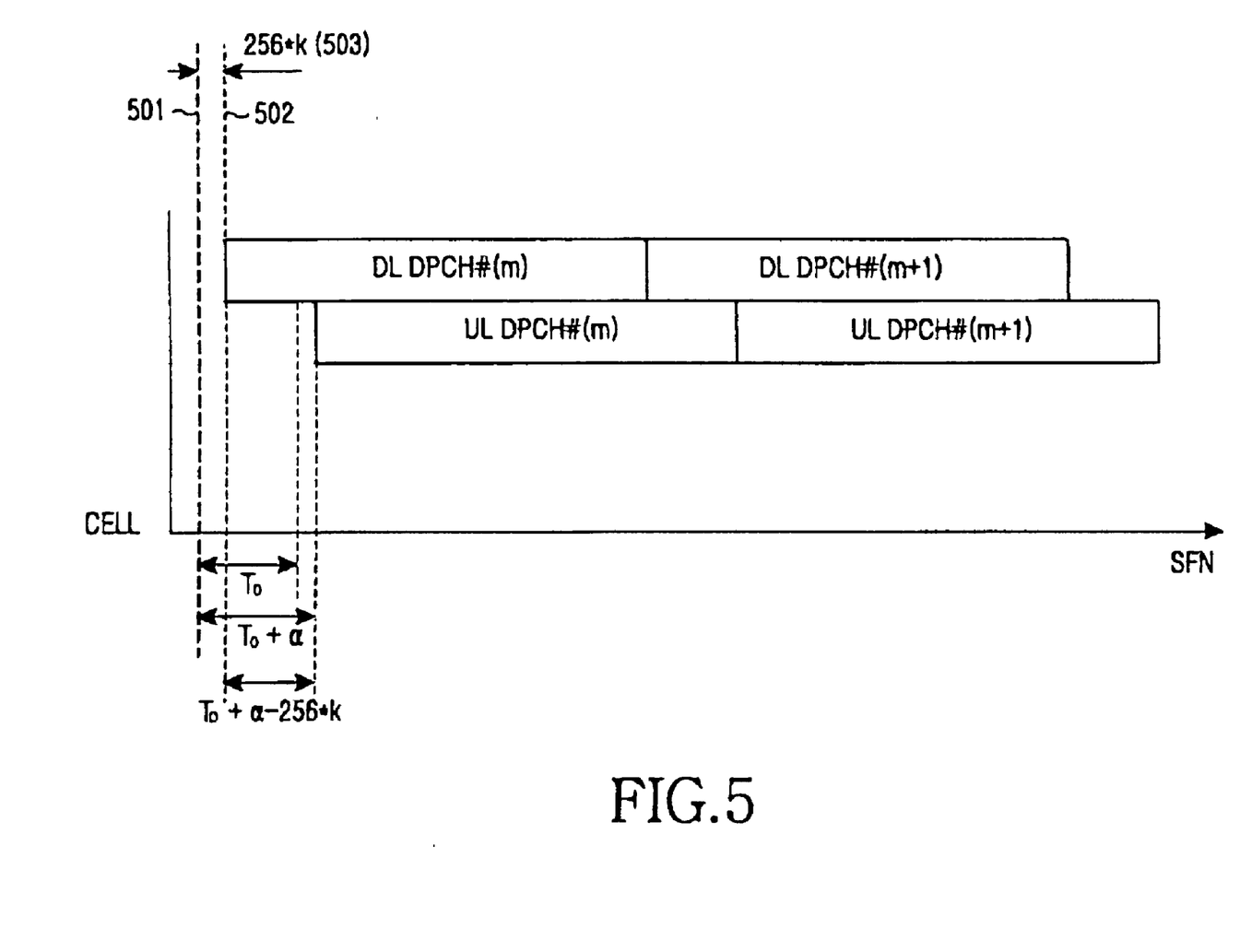
FIG. 5 illustrates alignment of the downlink DPCH with the uplink DPCH by delaying a downlink DPCH frame based on a received NCF at a node B in the CDMA communication system according to the present invention.

FIG. 5 illustrates alignment of the downlink DPCH frame with the uplink DPCH by delaying the downlink DPCH frame according to the NCF in the node B of the CDMA communication system according to the embodiment of the present invention.

Referring to FIG. 5, the node B aligns the downlink DPCH frame with the uplink DPCH frame by delaying the downlink DPCH frame according to NCF(k) to make the UE Rx–Tx time difference 128 chips or less. Specifically, reference numeral 501 denotes the starting received time of the downlink DPCH frame before alignment, reference numeral 502 denotes the starting received time of the downlink DPCH frame after alignment, and reference numeral 503 denotes the time delay of the node B by which the node B determines the NCF. The NCF is set to a multiple of 256 chips.

With regard to determination of delaying the uplink DPCH, the RNC determines whether the UE Rx–Tx time difference satisfies the condition expressed as $$\alpha + SU \times UCF < \Delta \quad (2)$$

If Eq. (2) is satisfied, the RNC transmits the UCF to the node B and the UE by the Radio Link Reconfiguration prepare message and the Physical Channel Reconfiguration message, respectively. The SU (Shifting Unit) is set to 1, 4, 8, 16, 64, 128, or 256 chips. The SU is usually 128 chips, or 147 chips with a stabilizing value added.

Figure 6:
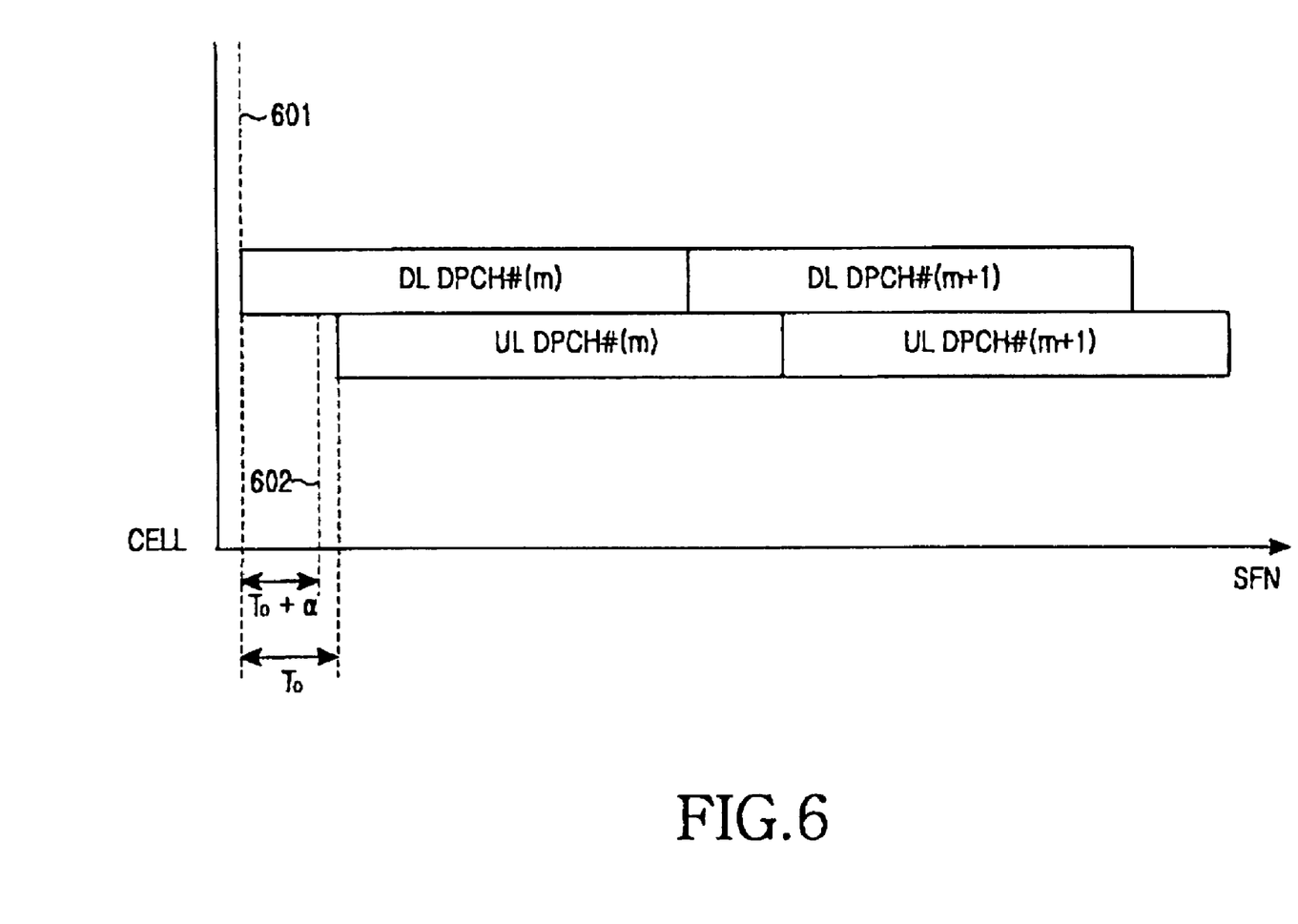
FIG. 6 illustrates the time difference between the received time of the downlink DPCH and the transmitted time of the uplink DPCH at the UE in the CDMA communication system according to another embodiment of the present invention.

FIG. 6 illustrates measuring the UE Rx–Tx time difference in the UE upon request from the RNC in the CDMA communication system according to another embodiment of the present invention. Here, the UE Rx–Tx time difference is less than $T_0-\Delta$. Since delaying the downlink DPCH frame causes information loss due to data frame overlap in the first embodiment of the present invention, the uplink DPCH frame is delayed for time adjustment. Referring to FIG. 6, reference numeral 601 denotes the received time of the downlink DPCH frame and reference numeral 602 denotes the starting transmitted time of the uplink DPCH frame.

Figure 7:
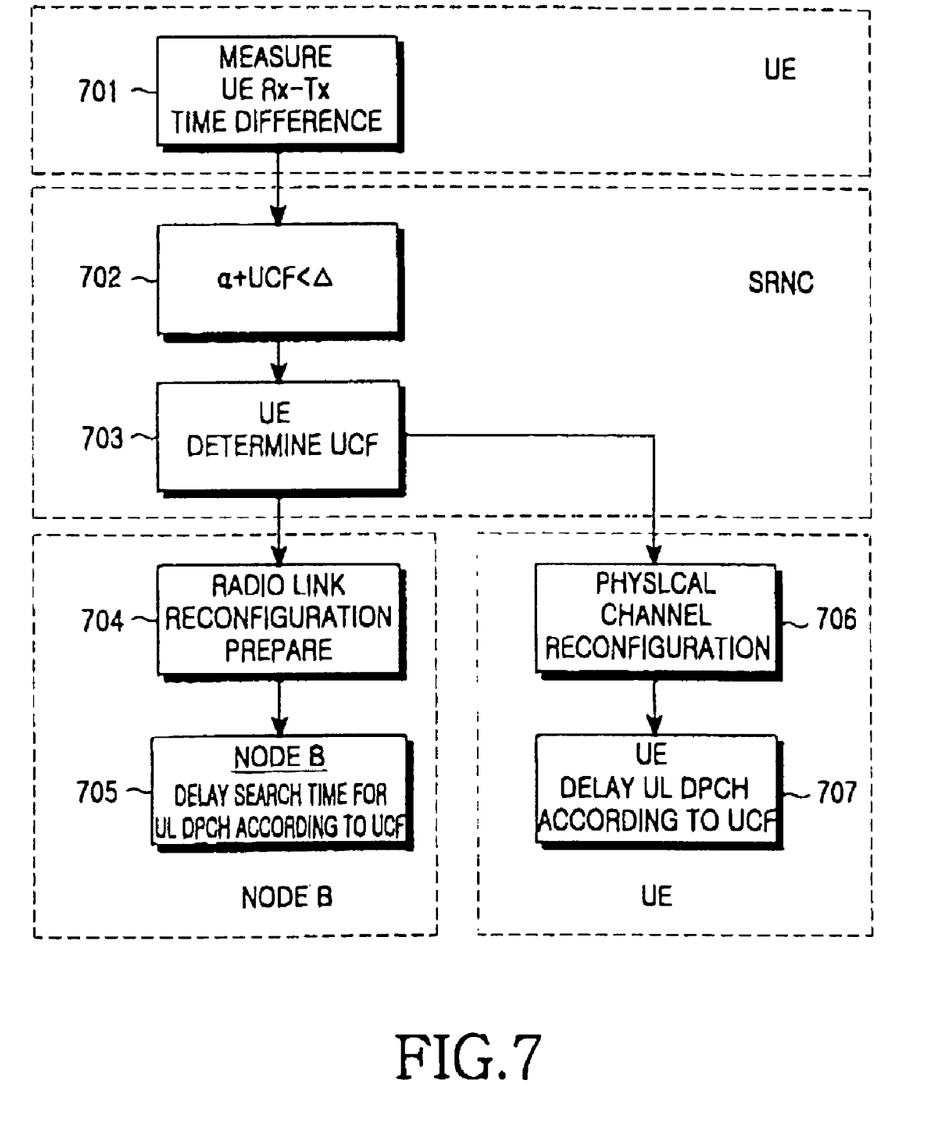
FIG. 7 is a flowchart illustrating an ATTA method in the CDMA communication system according to the second embodiment of the present invention.

FIG. 7 is a flowchart illustrating a robust transmission time adjustment method in the CDMA communication system according to the second embodiment of the present invention. The UCF is first determined using the UE Rx–Tx time difference and transmitted to the node B by the Radio Link Reconfiguration Prepare message and the Physical Channel Reconfiguration message, respectively.

Referring to FIG. 7, upon request from the RNC, the UE measures the UE Rx–Tx time difference and reports it to the RNC in step 701. The RNC determines whether the UE Rx–Tx time difference satisfies Eq. (2) in step 702 and sets the UCF that makes $\alpha$ equal to or less than the threshold $\Delta$ if Eq. (2) is satisfied in step 703. The RNC transmits the UCF to the node B by the Radio Link Reconfiguration Prepare message in step 704 and to the UE by the Physical Channel Reconfiguration message in step 706. Upon receipt of the Radio Link Reconfiguration Prepare message, the node B detects the UCF from the message and delays a searching time for the uplink DPCH frame according to the UCF in step 705. Upon receipt of the Physical Channel Reconfiguration message, the UE detects the UCF from the message and delays the transmission time of the uplink DPCH frame according to the UCF in step 707. If the SU is 256 chips, the UCF is 1, 2 or 3. The UE delays the uplink DPCH frame by 256 chips for UCF=1, by 256×2 chips for UCF=2, or by 256×3 chips for UCF=3.

Figure 8:
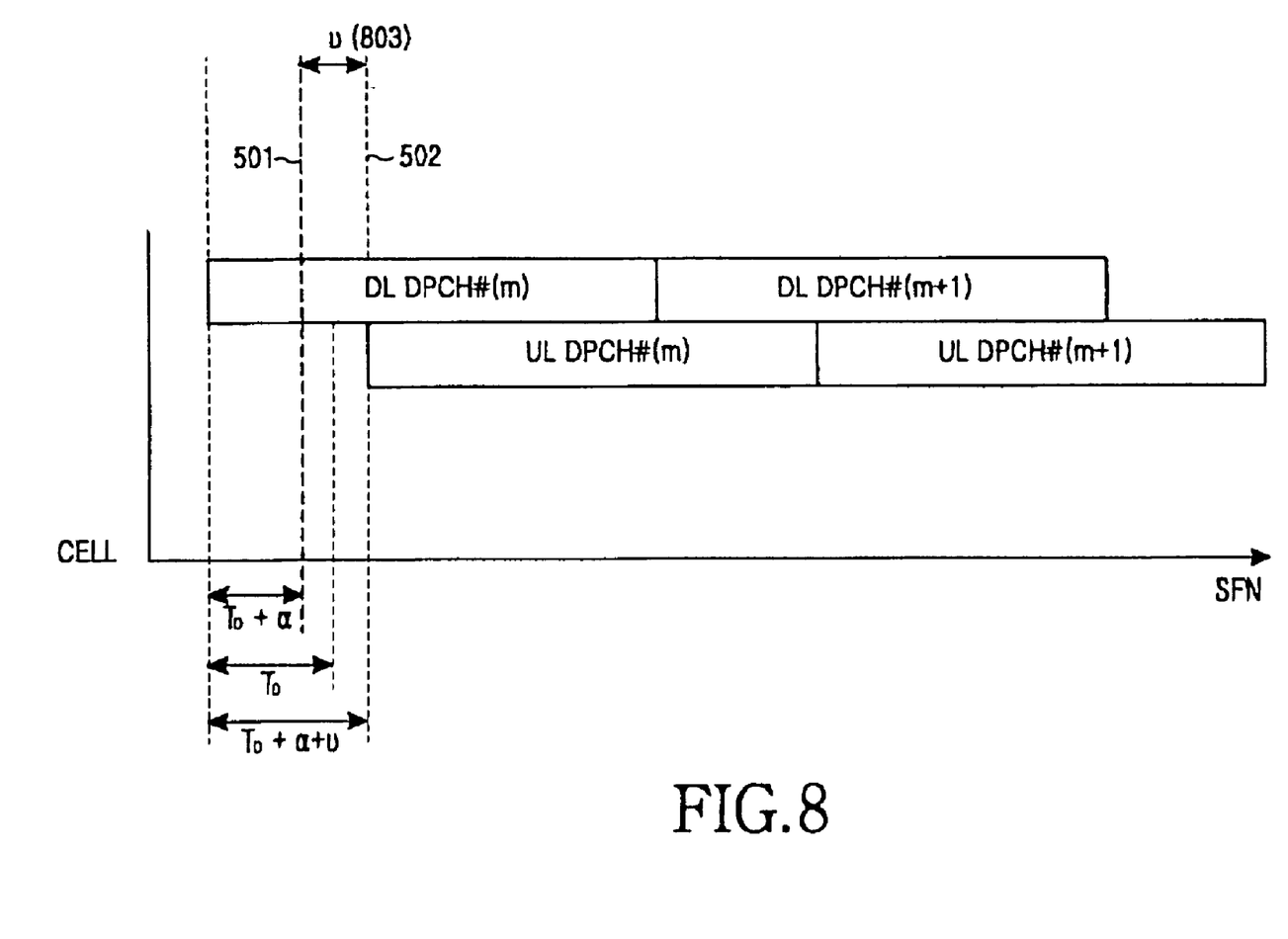
FIG. 8 illustrates the time difference between the downlink DPCH and the uplink DPCH after the ATTA in the CDMA communication system according to the second embodiment of the present invention.

FIG. 8 illustrates alignment of the uplink DPCH frame with the downlink DPCH by delaying the uplink DPCH frame according to the UCF in the UE of the CDMA communication system according to the second embodiment of the present invention.

Referring to FIG. 8, the UE aligns the uplink DPCH frame with the downlink DPCH frame by delaying the uplink DPCH frame according to UCF(v). Reference numeral 803 denotes the time delay of the UE by the UCF. The UCF is set to 1, 4, 8, 16, 128, or 256 chips.

Transmission time adjustment in the case of two nodes B in a handover region will be described below. Obviously, the same transmission time adjustment method is applied when three nodes B exist in the handover region.

In the handover region, the UE receives downlink DPCH frames from the two nodes B. The UE measures different UE Rx–Tx time differences between the uplink DPCH frame and the downlink DPCH frames that have arrived at the UE at different times and reports them to the RNC. The RNC determines an NCF or UCF according to Eq. (1) and Eq. (2) using the two UE Rx–Tx time differences.

If the RNC determines two NCFs, it delays each downlink DPCH frame according to a corresponding NCF. The node B delays the transmission time of the downlink DPCH frame by 256 chips for NCF=1, by 256×2 chips for NCF=2, and 256×3 chips for NCF=3.

Figure 9:
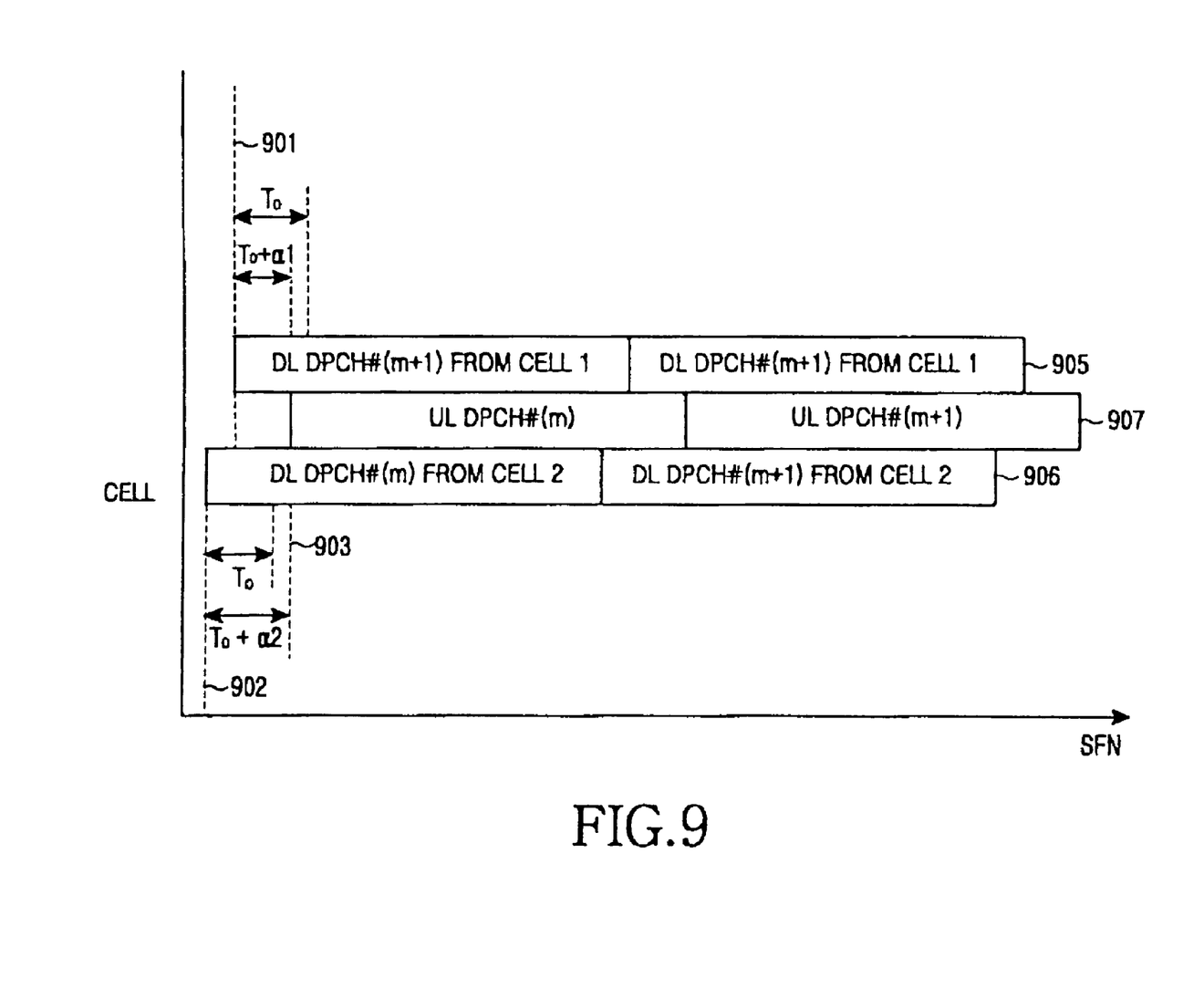
FIG. 9 illustrates the CFN (Connection Frame Number)/ SFN (System Frame Number) observed time difference between the downlink DPCH frame and the uplink DPCH frame in the CDMA communication system according to a third embodiment of the present invention.

FIG. 9 illustrates the received times of downlink DPCH frames 905 and 906 and the transmitted time of an uplink DPCH frame 907 on the CFN (SFN) axis in the UE in the case where the RNC determines a UCF for cell 1 and an NCF for cell 2.

Referring to FIG. 9, reference numerals 901 and 902 denote the received times of the downlink DPCH frame 905 and the downlink DPCH frame 906, respectively. Reference numeral 903 denotes the starting transmitted time of the uplink DPCH frame 907. In the handover region, the time difference between the uplink DPCH frame 907 and the downlink DPCH frame 905 is different from hat between the uplink DPCH frame 907 and the downlink DPCH frame 906.

Figure 10:
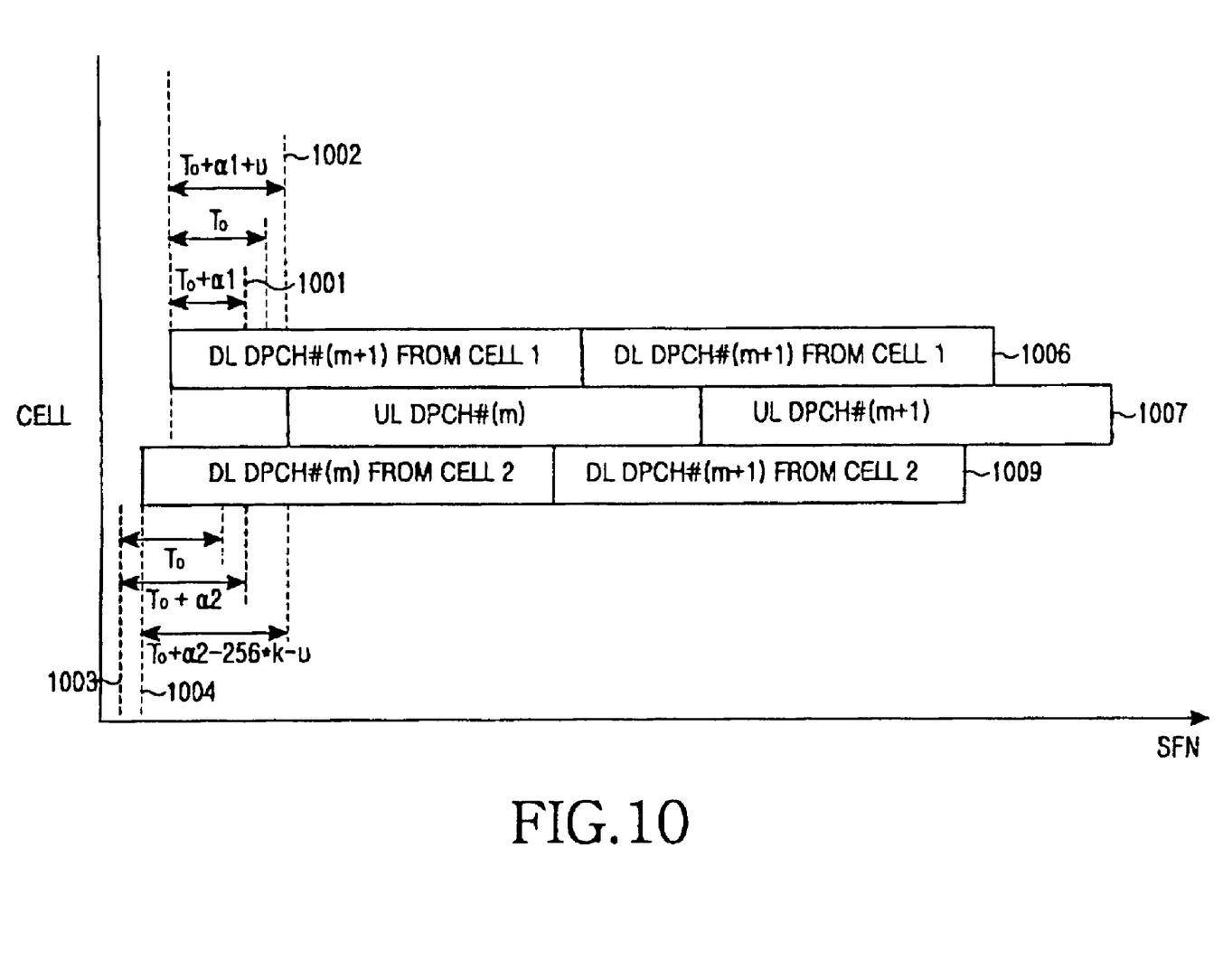
FIG. 10 illustrates the time difference between the downlink DPCH frame and the uplink DPCH frame after delaying the uplink DPCH frame and aligning the uplink DPCH frame with the downlink DPCH frame at the UE in the CDMA communication system according to the third embodiment of the present invention.

FIG. 10 illustrates alignment of the uplink DPCH frame with the downlink DPCH frame from cell 1 by delaying the uplink DPCH frame according to a received value UCF(v) in the UE.

Referring to FIG. 10, reference numeral 1001 denotes the transmission times of the uplink DPCH frame 907 of FIG. 9 before time alignment and reference numeral 1002 denotes the transmission times of an uplink DPCH frame 1007 after time alignment. Reference numeral 1003 denotes the received time of a downlink DPCH frame 1009 from cell 2 before time alignment. For alignment of the uplink DPCH frame 1007 with the downlink DPCH frame 1009 from cell 2, the RNC should determines an NCF that satisfies Eq. (3).

$$\alpha + SU \times UCF < 256 \times NCF + \Delta \tag{3}$$

where the UCF is a time delay for time alignment already calculated by Eq. (2).

Reference numeral 1004 denotes the received time of a downlink DPCH frame from cell 2 after time alignment by Eq. (3). Control signals for the transmission time adjustment are transmitted by the Radio Link Reconfiguration Prepare message and the Physical Channel Reconfiguration message, with a CFN-related field added for simultaneous transmission time adjustment for cell 1 and cell 2.

Figure 11:
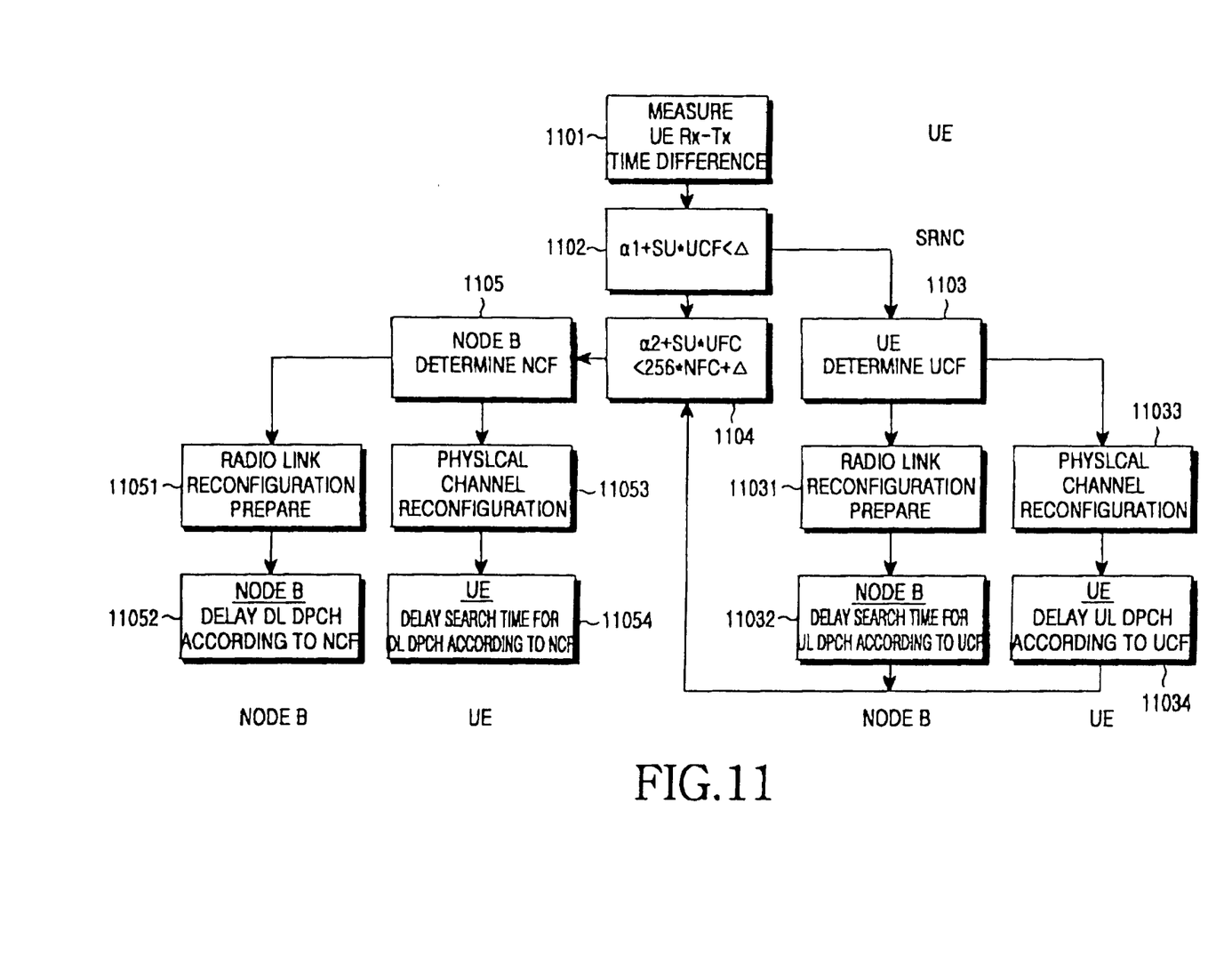
FIG. 11 is a flowchart illustrating an ATTA method in the CDMA communication system according to the third embodiment of the present invention.

FIG. 11 is a flowchart illustrating a transmission time adjustment method using a UCF and an NCF calculated by UR Rx-Tx time differences in a handover region according to a third embodiment of the present invention. The UCF and NCF are transmitted to the nodes B and the UE, respectively by the Radio Link Reconfiguration Prepare message and the Physical Channel Reconfiguration message.

Referring to FIG. 11, upon request from the RNC, the UE measures UE Rx-Tx time differences α1 and α2 for the radio links of cell 1 and cell 2 and reports them to the RNC in step 1001. The RNC determines whether the UE Rx-Tx time difference for cell 1 satisfies Eq. (2) in step 1102. If it does not, the RNC awaits the next UE Rx-Tx time difference for cell 1 (not shown). On the other hand, if Eq. (2) is satisfied, the RNC determines a UCF that makes α1 equal to or less than the threshold Δ for the radio link of cell 1 in step 1103. Then the RNC transmits the UCF to the node B of cell 1 by the Radio Link Reconfiguration Prepare message in step 11031 and to the UE by the Physical Channel Reconfiguration message in step 11033. Upon receipt of the Radio Link Reconfiguration Prepare message, the node B of cell 1 detects the UCF from the message and delays a search time for the uplink DPCH frame according to the UCF in step 11032. In step 11034, upon receipt of the Physical Channel Reconfiguration message, the UE detects the UCF from the message and delays the transmission time of the uplink DPCH frame according to the UCF. If the SU is 256, the UCF is 1, 2 or 3. The UE delays the uplink DPCH frame by 256 chips for UCF=1, by 256×2 chips for UCF=2, and by 256×3 chips for UCF=3.

Concurrently, in steps 1104 and 1105, the RNC determines an NCF that satisfies Eq. (3) using the UE Rx-Tx time difference α2 for the radio link of cell 2 that has reflected the time alignment for cell 1. That is, the RNC sets an NCF that makes α2 equal to or less than the threshold Δ for the radio link of cell 2. Then the RNC transmits the NCF to the node B of cell 2 by the Radio Link Reconfiguration Prepare message in step 11051 and to the UE by the Physical Channel Reconfiguration message in step 11053. Upon receipt of the Radio Link Reconfiguration Prepare message, the node B of cell 2 detects the NCF from the message and delays the transmission time of its downlink DPCH frame according to the NCF in step 11052. Here, the NCF is 1, 2 or 3. In step 11054, upon receipt of the Physical Channel Reconfiguration message, the UE detects the NCF from the message and delays a search time for the downlink DPCH frame from cell 2 according to the NCF.

While it has been described that the downlink DPCH from cell 2 is determined to be delayed with respect to the downlink DPCH from cell 1, if a certain amount of DPCH frame loss is accepted, the downlink DPCH from cell 2 can be transmitted earlier than before to be aligned with the uplink DPCH. Also in this case, signaling is performed using the Radio Link Reconfiguration Prepare message and the Physical Channel Reconfiguration message.

In accordance with the present invention as described above, the RNC transmits transmission time adjustment control information to the node B and the UE so that time alignment is stably and adaptively made between the downlink DPCH frame and the uplink DPCH frame during a handover.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of changing the transmission time of data in a CDMA communication system where a UE (User Equipment) measures the time difference between the received time of a downlink DPCH (Dedicated Physical Channel) and the transmitted time of an uplink DPCH and reports the time difference to an RNC (Radio Network Controller), the method comprising the steps of:

transmitting transmission time adjustment information to a node B and the UE by the RNC if the time difference is out of a predetermined range;

adjusting the transmission time of the downlink DPCH according to the transmission time adjustment information and transmitting the downlink DPCH at the adjusted time by the node B; and receiving the downlink DPCH by the UE using the transmission time adjustment information.

2. The method of claim 1, wherein the transmission time adjustment information is an NCF (Node B Control Factor) that satisfies $$\alpha < 256 \times NCF + \Delta \tag{4}$$

where α is a timed delay and Δ is a threshold time delay.

3. The method of claim 1, wherein the transmission time adjustment information is transmitted to the node B by a Radio Link Reconfiguration Prepare message.

4. The method of claim 1, wherein the transmission time adjustment information is transmitted to the UE by a Physical Channel Reconfiguration message.

5. A method of changing the transmission time of data in a CDMA communication system where a UE (User Equipment) measures the time difference between the received time of a downlink DPCH (Dedicated Physical Channel) and the transmitted time of an uplink DPCH and reports the time difference to an RNC (Radio Network Controller), the method comprising the steps of:

the RNC transmitting to a node B and the UE transmission time adjustment information for making the time difference within a predetermined range;

the UE adjusting the transmission time of the uplink DPCH according to the transmission time adjustment information and transmitting the uplink DPCH at the adjusted time; and the node B receiving the uplink DPCH according to the transmission time adjustment information.

6. The method of claim 5, wherein the transmission time adjustment information is a UCF (UE Control Factor) that satisfies $$\alpha + SU \times UCF < \Delta \tag{5}$$

where $\alpha$ is a timed delay, $\Delta$ is a threshold time delay, and SU is a shifting unit.

7. The method of claim 5, wherein the transmission time adjustment information is transmitted to the node B by a Radio Link Reconfiguration Prepare message.

8. The method of claim 5, wherein the transmission time adjustment information is transmitted to the UE by a Physical Channel Reconfiguration message.

9. An adaptive transmission time adjustment method in a CDMA communication system where a UE (User Equipment) establishes radio links with a plurality of node Bs, measures the time differences between the received times of downlink DPCHs (Dedicated Physical Channel) from each of the plurality of node Bs and the transmitted time of an uplink DPCH, and reports the time differences to an RNC (Radio Network Controller), the method comprising the steps of:

setting first transmission time adjustment information that makes the time difference for a first node B satisfy a first condition, transmitting the first transmission time adjustment information to the first node B and the UE, and transmitting to second nodes Bs and the UE second transmission time adjustment information that makes the time differences for the second node Bs satisfy a second condition by the RNC, the second node Bs being the node Bs having the radio link with the UE except the first node B;

adjusting the transmission time of the uplink DPCH by the UE for the first node B according to the first transmission time adjustment information, transmitting the uplink DPCH to the first node B at the adjusted time, and changing a search time for the downlink DPCHs according to the second transmission time adjustment information;

receiving the uplink DPCH by the first node B by adjusting a search time for the uplink DPCH according to the first transmission time adjustment information; and changing the transmission time of the downlink DPCHs by the second nodes B according to the second transmission time adjustment information and transmitting the downlink DPCHs at the changed time.

10. The method of claim 9, wherein the first transmission time adjustment information is a UCF (UE Control Factor) that satisfies $$\alpha + SU \times UCF < \Delta \tag{6}$$

where $\alpha$ is a timed delay, $\Delta$ is a threshold time delay, and SU is a shifting unit.

11. The method of claim 9, wherein the second transmission time adjustment information is an NCF (Node B Control Factor) that satisfies $$\alpha + SU \times UCF < 256 \times NCF + \Delta \tag{7}$$

where $\alpha$ is a timed delay, $\Delta$ is a threshold time delay, and SU is a shifting unit.

12. The method of claim 9, wherein the first and second transmission time adjustment information is transmitted to the nodes B by a Radio Link Reconfiguration Prepare message.

13. The method of claim 9, wherein the first and second transmission time adjustment information is transmitted to the UE by a Physical Channel Reconfiguration message.

14. A method of adjusting the transmitted time of a second downlink DPCH (Dedicated Physical Channel) to the transmitted time of an uplink DPCH in a CDMA communication system where a UE (User Equipment) receives a first downlink DPCH from a first node B, measures a first time difference between the received time of the first downlink DPCH and the transmitted time of the uplink DPCH, reports the first time difference to an RNC (Radio Network Controller) connected to the first node B and a second node B adjacent to the first node B, and transmits to the RNC a second time difference between the received time of the second downlink DPCH and the transmitted time of uplink DPCH when the first time difference is within a predetermined range and the UE moves out of the first node B and enters the coverage area of the second node B, the method comprising the steps of:

transmitting to the second node B and the UE transmission time information that makes the first time difference within the predetermined range by the RNC;

adjusting the transmission time of the second DPCH according to the transmission time adjustment information received by the second node B; and receiving the second downlink DPCH according to the transmission time adjustment information by the UE.

15. The method of claim 14, wherein the transmission time adjustment information is an NCF (Node B Control Factor) that satisfies $$\alpha < 256 \times NCF + \Delta \tag{8}$$

where $\alpha$ is a timed delay and $\Delta$ is a threshold time delay.

16. The method of claim 14, wherein the transmission time adjustment information is transmitted to the second node B by a Radio Link Reconfiguration Prepare message.

17. The method of claim 14, wherein the transmission time adjustment information is transmitted to the UE by a Physical Channel Reconfiguration message.

* * * * *